M. E. HIDDEN.
INTAKE FOR GAS ENGINES.
APPLICATION FILED JUNE 13, 1913.
1,098,626.
Patented June 2, 1914.
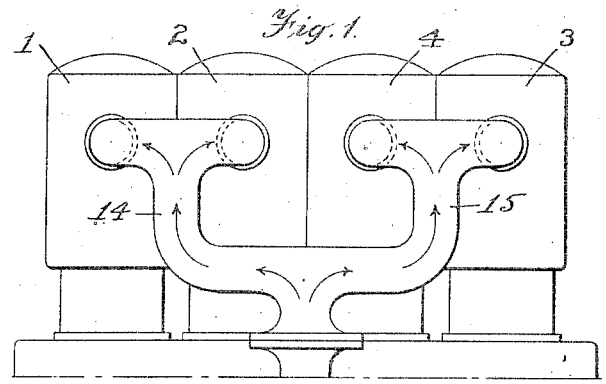
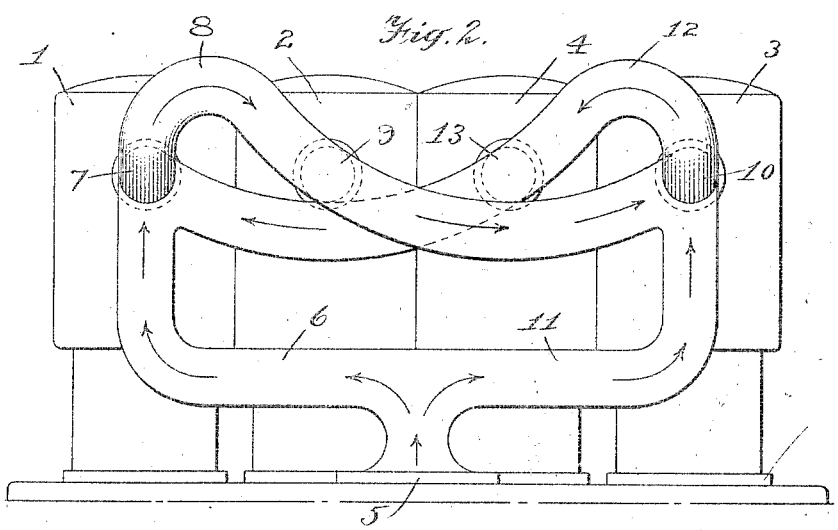
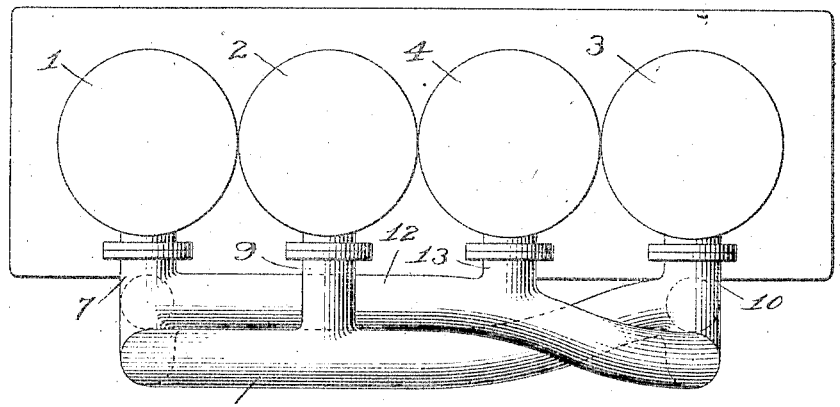

UNITED STATES PATENT OFFICE.

MORTON E. HIDDEN, OF EAST ORANGE, NEW JERSEY, ASSIGNOR TO WILLIS H. SIMPSON, OF EAST ORANGE, NEW JERSEY.

INTAKE FOR GAS-ENGINES.

1,098,626. Specification of Letters Patent. Patented June 2, 1914.

Application filed June 13, 1913. Serial No. 773,431.

*To all whom it may concern:*

Be it known that I, MORTON E. HIDDEN, a citizen of the United States, and resident of East Orange, county of Essex, and State of New Jersey, have invented certain new and useful Improvements in Intakes for Gas-Engines, of which the following is a specification.

This invention relates to an improved arrangement of the intake or supply pipes for a gas engine, particularly for a four cylinder automobile engine.

The object of the invention is to provide a continuous path to the successive cylinders in the order of their firing and to provide an uninterrupted flow and constant supply of gas of a uniform mixture to the cylinders.

In carrying out the invention, I provide a peculiar arrangement for the intake pipes or manifold in which the several cylinders are connected together successively in the order of their firing.

In the drawings like parts in the several views have been given the same reference numerals.

Figure 1 is a representation of the ordinary arrangement of the intake upon a four cylinder engine. Fig. 2 is a side elevation illustrating one arrangement of my improved form of intake for a four cylinder engine. Fig. 3 is a plan view of Fig. 2.

In Figs. 2 and 3, the cylinders of the engine are numbered 1, 2, 3 and 4 respectively in the order of their firing. The carbureter is connected with the lower end of the intake at 5, from which the gas mixture passes through the intake pipes in the direction indicated by the arrows.

The explosive charge is drawn into the cylinder 1 through the pipes 6 and 7 and as its intake valve closes the cylinder 2 next draws in its supply, continuing the flow of the gas through the pipes 8 and 9. The cylinder 3 next draws in its supply of gas through its intake 10, still continuing the flow through the pipes 6 and 8 and also drawing an additional supply directly from the carbureter through the pipe 11. As the intake valve closes in the cylinder 3 the cylinder 4 draws in its supply of gas through its intake pipe 13, continuing the flow from the pipes 8 and 11 through the pipe 12, and as its intake valve closes the flow of gas continues through the pipe 12 to the point where it joins the pipe 6 and the intake pipe 7 for the cylinder 1, where the cycle of operation is repeated. It will thus be seen that the gas supply is continuous and flows successively to each cylinder as the same draws in its supply. This operation is distinguished from the ordinary arrangement shown in Fig. 1, in which the gas flows to the cylinders 1 and 2 through the pipe 14 but is then stopped in its flow while the cylinders 3 and 4 are drawing in their supply through the pipe 15. The suction from the cylinders 3 and 4 also tends to draw some of the mixture from the pipe 14 in a reverse direction, with the result that when the intake valves of the cylinders 1 and 2 again open the mixture which is first drawn in from the pipe 14 is weaker or more rarefied than the proper mixture until the pipe 14 has been emptied of this weak mixture and supplied with fresh gas. The same is true upon the second operation of the cylinders 3 and 4, as will be readily understood.

With the improved arrangement, as illustrated in Figs. 2 and 3, it will be seen that the mixture will be uniform, as the flow is continuous and in one direction through the several pipes, resulting in a perfect mixture being supplied to the cylinders and, consequently, a much smoother operation of the engine and an increase in power from the explosions.

It will be understood that the arrangement as shown is merely illustrative for one particular type of engine. In engines having a different order of firing for the cylinders it is only necessary to change the point of supply so as to preserve the continuous flow of gas successively to the cylinders in the order of their firing.

What I claim is:

1. In an explosive engine, the combination with a plurality of cylinders and a source of fuel supply, of a plurality of intake pipes arranged in series and connecting successively each of the cylinders in the order of their firing to provide a continuous flow of gas in the same direction therethrough to said cylinders.

2. In a four cylinder explosive engine, the combination with a plurality of cylinders and a carbureter, of intake pipes extending from the carbureter to the first and third cylinders in the order of their firing, a connecting pipe from the first to the second and third cylinders, and a connecting pipe from the third to the fourth and first cylinders, said pipes being interconnected at the first and third cylinders.

3. In an explosive engine, the combination with a plurality of cylinders and a carbureter, of a series of intake pipes connecting successively each of the cylinders in the order of their firing, said pipes being interconnected at alternate cylinders, and supply pipes from the carbureter to said intake pipes.

4. In an explosive engine, the combination with a plurality of cylinders and a carbureter, of a series of intake pipes connecting successively each of the cylinders in the order of their firing, said pipes being interconnected at alternate cylinders, and supply pipes from the carbureter connected to said intake pipes at the point of their interconnection.

5. In a four cylinder explosive engine, the combination with a plurality of cylinders and a carbureter, of an intake providing a passage for the gas from the carbureter to the first three cylinders successively in the order of their firing, and an intake providing a passage for the gas from the carbureter to the third, fourth and first cylinder successively, said intakes being joined at the first and third cylinders.

Signed at New York city, N. Y., this 10th day of June, 1913.

MORTON E. HIDDEN.

Witnesses:
  Lewis J. Doolittle,
  Willis H. Simpson.